INJECTION MOLDING NOZZLE WITH FLOW-CONTROL MECHANISM

Original Filed Nov. 12, 1968 2 Sheets-Sheet 1

INVENTOR.
JOHN GORON

BY

ATTORNEY

INJECTION MOLDING NOZZLE WITH FLOW-CONTROL MECHANISM
Original Filed Nov. 12, 1968 2 Sheets-Sheet 2
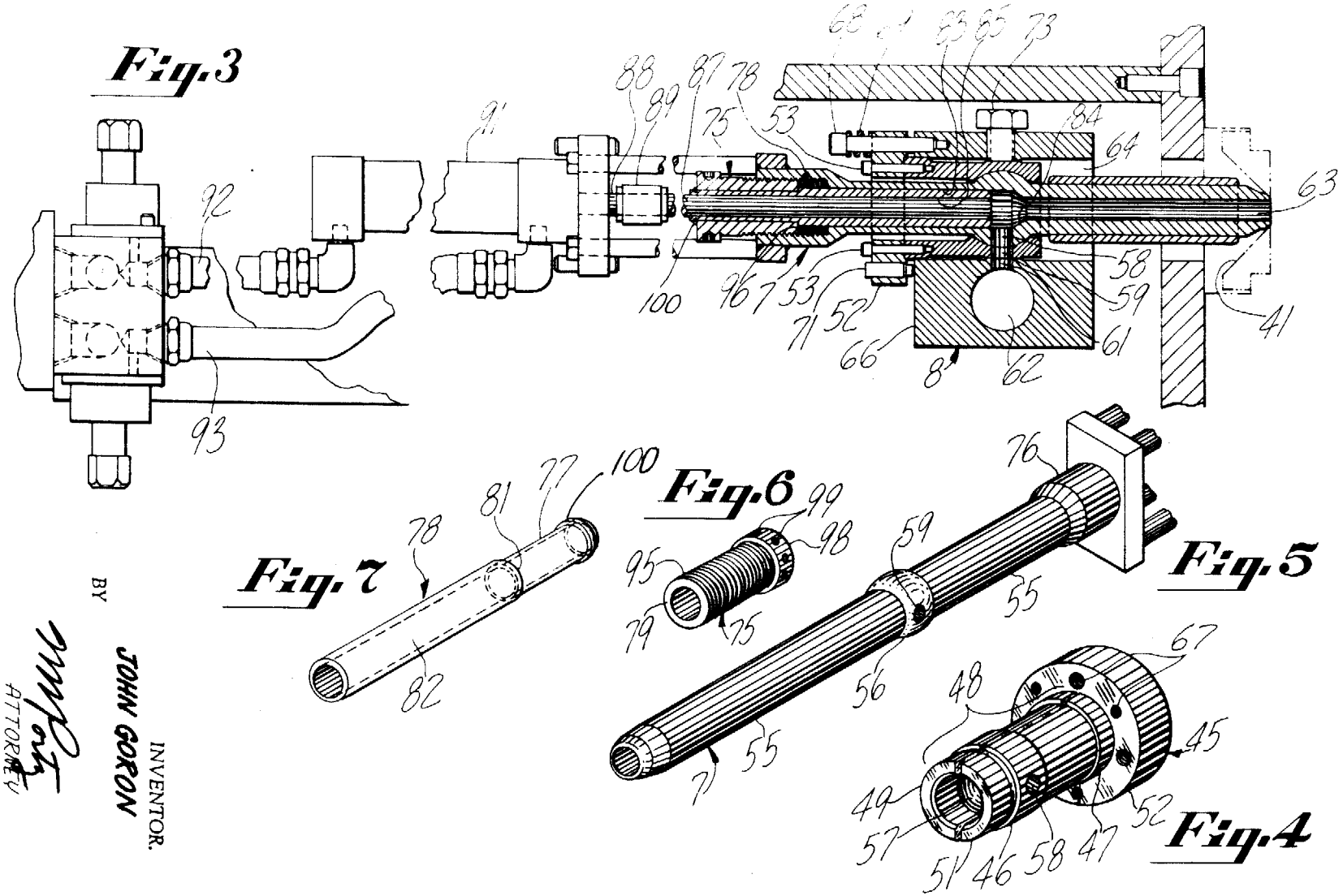
INVENTOR.
JOHN GORON
BY
M Porter
ATTORNEY United States Patent Office Re. 28,144
Reissued Sept. 3, 1974

28,144
INJECTION MOLDING NOZZLE WITH FLOW-CONTROL MECHANISM

John Goron, Cranford, N.J., by Midland-Ross Corp., Cleveland, Ohio, assignee

Original No. 3,561,062, dated Feb. 9, 1971, Ser. No. 774,851, Nov. 12, 1968. Application for reissue Dec. 11, 1972, Ser. No. 314,106
Int. Cl. B29f *1/00*
U.S. Cl. 425—191 5 Claims

Matter enclosed in heavy brackets [ ] appears in the original patent but forms no part of this reissue specification; matter printed in italics indicates the additions made by reissue.

ABSTRACT OF THE DISCLOSURE

A manifold and nozzle assembly within injection molding equipment which will normally comprise an extruder, an accumulator, a manifold, and a plurality of nozzles projecting through the manifold. This invention is especially directed to flow-control valve mechanism within each nozzle in addition to shutoff valve mechanism.

A type of nozzle of more recent design respecting which the present invention provides an improvement including shutoff and duct-cleaning valve mechanism which results in a highly elongated nozzle unit. Such a unit has conventionally been rigidly attached to the manifold with any adjustability of the nozzle tip being obtained through movement of the manifold-nozzle assembly in its entirety. A more recent improvement by the present inventor described in an application filed simultaneously with this application concerns structure providing limited universal movement of the nozzle unit with respect to the manifold by which the nozzle is supported. Previously to the present invention, nozzle units of recent design include a shutoff valve mechanism comprising a pin-like plunger received within the central bore of the nozzle body wherein the plunger is traversable past a radial feed aperture for the bore to the distal end of the nozzle body in accomplishing clean-out as well as shutoff functions. In such machines, it is necessary to regulate the flow of material through the various nozzles to obtain approximately equal rates of discharge from the nozzles. This usually involves greater restriction of the feed lines to nozzles subjected to higher line pressures. In recent machines prior to the present invention, flow-controlling valve mechanisms have been attached to the manifold and related thereto to adjustably restrict material flow to individual branch passageways to respective nozzle units.

It is a principal object of this invention to eliminate the separate flow-control valves heretofore used by incorporating flow-control valve mechanism within a nozzle unit of the type in which the fluid plastic material is supplied through a side aperture of the nozzle body of the unit.

It is also an object of this invention to provide flow-control valve mechanism which is correlated and cooperative with shutoff valve mechanism of the nozzle unit.

It is a further object to provide flow-control mechanism that is part of a nozzle unit applicable generally to fluid-dispensing devices regardless of mode of support for the unit or the type of fluid dispensed.

To achieve these and other objects, the present invention provides a nozzle unit having an elongate body defining a central bore extending from its distal end and a coaxial counterbore extending from its proximal end which is connected with the bore by a circular shoulder surface disposed intermediately along the length of the body. The body has an aperture extending radially from its outer surface to a portion of the counterbore immediately adjacent the shoulder surface. The unit further comprises an elongate barrel having an outer cylindrical surface adapting it to be received in the counterbore in closely-fitting slidable relationship, and a pin-like plunger having an outer surface closely and slidably fitting the bores of the barrel and the body, such plunger being of a length adapting it to occupy both bores simultaneously. Flow-control function is established within the unit by arrangement of the body, the barrel, and the plunger in telescopic relationship with the plunger retracted out of the bore of the body and the barrel adjusted lengthwise of the body to partially or wholly expose the inner end of the body aperture. Shutoff function is accomplished by movement of the plunger to a position placing a portion thereof in the body bore, preferably with the distal end surface of the barrel seating on said shoulder.

In the drawing with respect to which the invention is described:

FIG. 3 is a fragmentary shortened plan view partly in section of the nozzle of FIG. 2, a portion of a mold cooperating therewith, and a valve and valve-actuating mechanism associated therewith;

FIG. 4 is a perspective view of a partially split sleeve normally occupying an opening in the manifold of the previous figures;

FIG. 5 is a perspective view of a nozzle body adapted to extend through and be supported in ball-in-socket relationship by the sleeve of FIG. 4;

FIG. 6 is a perspective view of an adjustment bushing adapted to fit within the head end of the nozzle of FIG. 5; and FIG. 7 is a perspective view of a tubular valve element having portions receivable in the bushing of FIG. 6 and the bore of the nozzle of FIG. 5.

Figure 1:
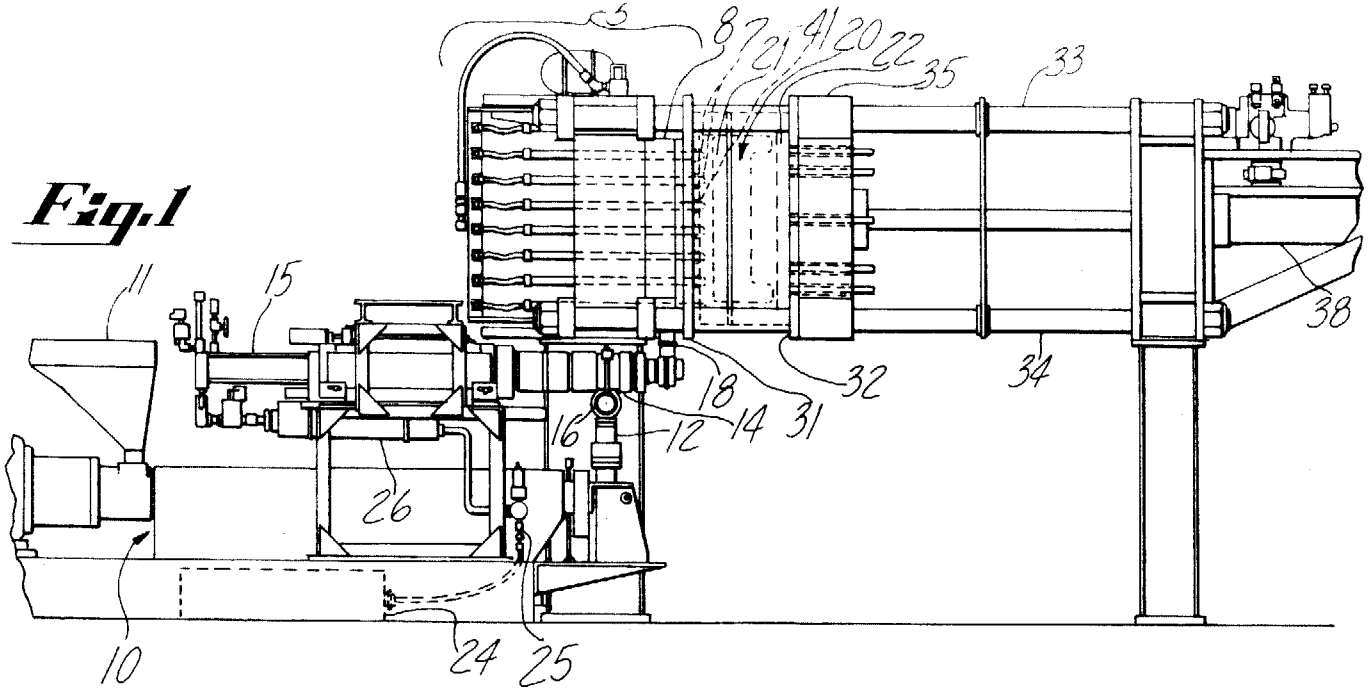
FIG. 1 is an elevation view of injection molding equipment in which the manifold and nozzle assembly of this invention is incorporated.
Figure 2:
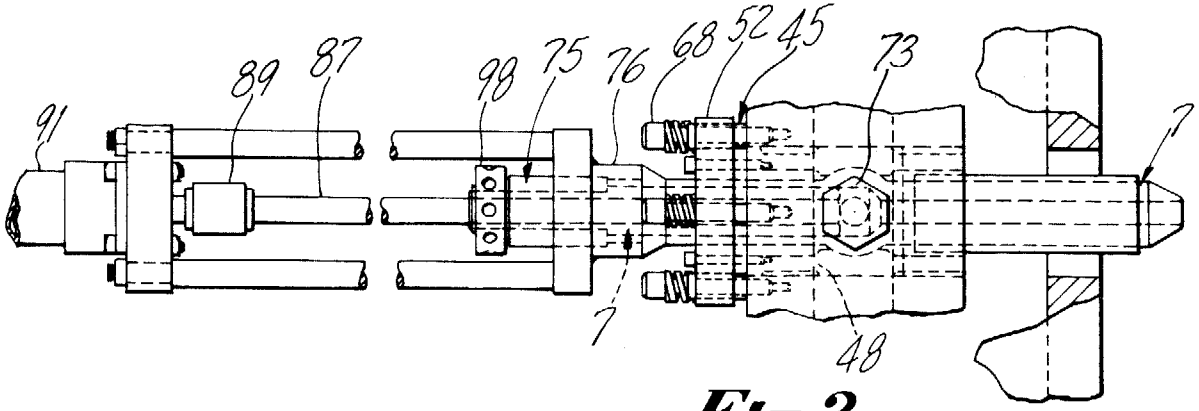
FIG. 2 is a fragmentary shortened side view illustrating a nozzle and an adjacent portion of a manifold in which the nozzle is supported.

FIG. 1 is provided for general illustration, with many details lacking, of the type of molding equipment in which the manifold and nozzle assembly 5 is typically incorporated. Except for the structure disclosed herein for pivotally mounting mold-feeding nozzles 7 in a manifold 8, the apparatus for supplying a plastic material to the manifold 8 is known and need be only generally discussed. The equipment shown in FIG. 1 for supplying the fluid plastic to the manifold 8 includes an extruder 10 having a hopper into which pellets or granules of thermoplastic resin are fed and begin passage through the equipment shown. The resin is converted by the extruder to a fluid state and passed upwardly through a duct 12 into an accumulator 14 actuated by hydraulic cylinder 15. As shown, a duct 12 joins with a manifold 16, shown merely in end view in FIG. 1, which may connect also with another accumulator (not shown) disposed in parallel relation with the accumulator 14. In a manner known, the extruder 10 may serve other manifold and nozzle assemblies, not shown, similar to assembly 5 from the manifold 16. The accumulator 14, is essence a hydraulic cylinder, stores the molten plastic continuously received from the extruder 10 and upon demand, ordinarily from a programmed control system operating the cylinder 15 and certain valves associated with the accumulator and manifold 14, discharges a plastic material through a feed pipe 18 into the manifold 8.

As the equipment shown in especially useful in injecting formable plasticized material into a mold 20 consisting of halves 21, 22, elements 24, 25, 26 may be provided for use in supplying a foaming agent into the barrel of the extruder 10. The molten plastic discharged by the extruder is retained under such pressures as to avoid foaming until it is injected into the cavity of the mold 20.

The mold halves 21, 22 are connected to mold-mounting plates 31, 32, respectively. The plate 31 is movably supported on four tie rods (see rods 33, 34) of the press. The mounting plate 32 is fixed to a movable platen 35. The manifold 8 is fixed to the fixed frame or platen structure 36 which has appropriate openings therethrough to accommodate actuating mechanism for the valve parts of the various nozzles 7. Hence, as the movable platen 35 moves to the mold-closing position at a predetermined mold-closing force exerted by its hydraulic actuating cylinder 38, the mold half 21 is supported at a substantially fixed molding position by the substantially non-yielding nozzle 7.

In the embodiment shown, universally pivotable joint structure for nozzles is provided which is yieldable or adjustable in the lengthwise direction of the nozzles as the nozzles engage sprue ports defined, e.g., by sprue bushings 41. The part of the joint structure attached to the manifold 8 is provided in a sleeve 45, shown separately in FIG. 4, which has raised cylindrical surfaces 46, 47 along its generally-cylindrical longitudinally-split tubular portion 48 consisting of transversely arcuate sections 49, 51. The sleeve 45 further comprises a one-piece annular flange to which the arcuate or half-sections 49, 51 are secured by means, such as cap screws 53, with a small clearance between the sections along the plane in which the tubular portion 48 is split.

The interior surface of the sleeve is necessarily of a configuration providing clearance with the outer generally-cylindrical surface 55 of the nozzle body 7 except for nozzle joint surface 56 and joint surface 57 of the sleeve normally engaged with surface 56. Surfaces 56 and 57 are of equatorial configuration approximately concentric to the same sphere. To enable universal movement of the nozzle relative to the sleeve, the surface 57 is preferably of greater width than the surface 56. The surface 57 is preferably centered as shown in radial alignment with the outer raised nozzle surface 46.

The sleeve and the nozzle (in assembled condition) have radially aligned apertures 59, 58, respectively, which are in alignment with a branch passageway or aperture 61 which together provide a connecting passageway which connects passageway 62 running longitudinally of the manifold 8 with the bore 63 of the nozzle. While apertures 58, 59 are shown in coaxial alignment with the aperture 61, it is possible for these apertures to move slightly out of coaxial alignment with aperture 61, as the sleeve and the nozzle are adjusted lengthwise of the manifold opening 64 to establish seating relation of the nozzle tip with the sprue bushing 41 or other seating surface.

Adjustability of the nozzle is enabled by extension of the flange 52 over an annular surface portion of a lateral manifold surface 66 and fastening means connecting the overlapping portions of the flange and the surface 66. In the embodiment shown, the flange 52 has holes 67 spaced along a circumference concentric to the axis of the sleeve 45 in parallel relation with such axis. Alternate holes 67 receive cap screws 68 which extend slidably through the flange 52 into the manifold 8 in threaded relation with the latter. Each cap screw 68 extends through a spring 69 normally maintained in a condition of compression between the head of the cap screw and the flange 52. The sleeve 52 thus has a range of movement afforded by the compressibility range of the spring 69. Another alternate group of holes 67 are threaded and receive set screws 71. In use, such screws project beyond their openings in the flange 52 into engagement with the manifold surface 66 to provide a desired spacing between the sleeve flange and the manifold. In practice, the manifold is brought into position relative to a mold to cause the nozzles supported by the manifold to bear against respective seating surfaces defining sprue entrances in the manner shown in FIGS. 1 or 7. At this juncture, the nozzle tips and the set screw tips may be examined with respect to contact with respective seats. If the nozzle is found to be in imperfect contact with the sprue entrance, the screws 71 of a nozzle may be adjusted outwardly or to the left as viewed in FIG. 3 until the screws lose contact with the surface 66. This adjustment may be made while the machine is cold and inoperative. This adjustment is performed preferably with a set screw 73 backed off from solid contact with the surface 46 of the sleeve 45. The set screw 73 is normally tightened against the sleeve to prevent any leakage of hot plastic between the sleeve and the manifold at the junction of openings 59, 61.

If preferred, the platen pressure of the press in which the manifold 8 is mounted may be raised to a level which causes the movable platen 35 to be moved toward the stationary platen supporting the nozzles sufficiently to move all nozzle and sleeve assemblies to the left as viewed in FIG. 3 until contact of the nozzle tip having the greatest original spacing from its seat is established. If reasonable machining tolerances are observed in the construction of the molding machine, such relative movement of the manifold and the mold providing the nozzle tip seating surfaces need not exceed more than .001". With the set screws 73 relieved slightly, the cap screws 71 may then be adjusted to attain uniformity in the pressure of the various nozzles against the mold.

As the essential feature of this invention, the nozzle unit comprises flow-control valve mechanism as well as shutoff valve mechanism. The flow-control valve mechanism includes an exteriorly threaded bushing 75 received in an enlarged proximal end portion 76 of the nozzle body 7a. The bushing has an internal bore suitably cylindrical to fit around the outer cylindrical surface 77 of a barrel 78. The end surface 79 of the bushing normally engages a shoulder 81 of the barrel 78. The shoulder 81 joins the surface 77 with another cylindrical surface 82 of the barrel of larger diameter complementary to a cylindrical surface or bore 83 of the nozzle body. It will be noted in FIG. 3 that bore 83 is of larger diameter than bore 63 and that the bores join in a frustroconical shoulder surface 84.

As shutoff valve mechanism, the internal surface or central bore 85 of the barrel 78 is of the same diameter as the nozzle bore 63 to provide a passageway substantially throughout the length of the nozzle body of uniform diameter for receiving a rod or plunger 87, which in conjunction with that portion of the nozzle body defining the bore 63 functions as a shutoff valve. The plunger 87 is connected with a piston rod 88 by coupling 89 and is thus traversable by the piston of a hydraulic cylinder unit 91 the full length of the bore 63. The unit 91 is of the double-acting type with oil supplied thereto by a suitable supply system including tubes 92 and 93.

Containing now the discussion of the flow-control mechanism incorporated within the nozzle 7, the bushing 75 has its external threaded surface 95 in threaded relation with a threaded counterbore 96 within the enlarged proximate end portion 76 of the nozzle body 7a. Since the inner end of the bushing 75 bears against the barrel shoulder 81, the barrel is adjusted toward the distal end of the nozzle by screwing the bushing 75 inwardly of the bore 96. Any inward movement of the barrel 78 will cause it to move across the inner end of the aperture 18 and thus restrict the flow of fluid material from the manifold passageway 62 into the bore 63. To facilitate turning of the bushing within the enveloping portion of the nozzle body, the bushing has a head portion 98 having cylindrical apertures 99 opening the lateral surface thereof which adapt the bushing for being rotated by a pin spanner wrench.

The flow-control mechanism is necessitated, for example, by progressive pressure drop along the length of the manifold which causes substantial variation in the pressure and, hence, the rate of delivery to the various nozzles supported by the manifold. The flow-control valve mechanism disclosed enables selective restriction at each nozzle in the flow of material thereinto in accordance with the manifold delivery pressure at that point. Thus, the various nozzles can be adjusted to dispense the fluid plastic at substantially equal rates.

The extruding pressures developed within the bore 63 acts on the end surface of the barrel 78 in a direction toward the proximal end of the nozzle body 7a to maintain the barrel shoulder 81 in engagement with the inner end surface 79 of the bushing 75. However, the bushing and the barrel may be locked into substantially fixed longitudinal relationship by a snap ring 100 received within a groove therefor in a marginal end area of the barrel surface 77.

The nozzle unit may be disassembled by disconnecting the cylinder unit 91 from the nozzle body, withdrawing the plunger 87 from the barrel 7, turning the bushing 75 out of the nozzle body, and extracting the barrel 78 from the proximal end of the nozzle body.

What is claimed is:

1. An injection molding machine comprising:

a nozzle unit including an elongate nozzle body having a central bore extending from its distal end and a coaxial counterbore extending from its proximal end, said bore and counterbore being joined in a circular shoulder surface disposed intermediately along the length of said body, said body having a radial aperture extending from a portion of the counterbore immediately adjacent to said shoulder surface to the outer surface of the body; an elongate barrel having an outer cylindrical surface received by said counterbore in closely-fitting slidable relationship, *a second central bore of approximately the same diameter as that of said body bore,* and a distal end surface adapted for seating on said shoulder surface; means acting on the body and the barrel for adjusting lengthwise of said counterbore toward and away from said shoulder surface to an extent exposing and closing off said aperture; and a pin-like plunger having an outer surface in closely-fitting slidable relation with said bores and a length adapting it to occupy both bores simultaneously; and means for supporting the nozzle unit with said aperture in communication with an external supply duct means.

2. An injection molding machine having a manifold and nozzle assembly comprising:

a manifold having an opening extending therethrough from one side to an opposite side *adapting the manifold for extension of said assembly therethrough* and a passageway therein terminating in a surface defining said opening intermediately of said sides;

a nozzle unit comprising an elongate nozzle body having a central bore extending from its distal end and a coaxial counterbore extending from its proximal end, said bore and counterbore being joined in a circular shoulder surface disposed intermediately along the length of said body, said body having a radial aperture extending from a portion of the counterbore immediately adjacent to said shoulder surface to the outer surface of the body; an elongate barrel having an outer cylindrical surface received by said counterbore in closely-fitting slidable relationship, *a second central bore of approximately the same diameter as that of said body bore,* and a distal end surface adapted to seat on said shoulder surface; means acting on the body and the barrel for adjusting lengthwise of said counterbore toward and away from said shoulder surface to an extent exposing and closing off said aperture; and a pin-like plunger having an outer surface in closely-fitting slidable relation with surfaces defining said bores and a length adapting it to occupy both bores simultaneously; and means for supporting the nozzle unit within said opening with said distal end of the body projecting beyond the manifold, said supporting means defining a leak-proof connection between the manifold and the body disposing said aperture in communication with said passageway.

3. The machine of claim 2 wherein:

a portion of the outer surface of said barrel nearer the proximal end of said nozzle body is of substantially less diameter than said counterbore to define a shoulder on the barrel intermediately of the barrel length, and the nozzle unit comprises bushing means in threaded relation with the unit having means which extends the full length of the cavity occurring between said smaller diameter surface and the counterbore surface.

4. The machine of claim 2 wherein:

said nozzle body has a second counterbore defined by a threaded surface contiguous with its proximal end and larger in diameter than said counterbore;

a portion of the outer surface of said barrel nearer the proximal end of said nozzle body is of substantially less diameter than said first-named counterbore to define a shoulder on the barrel intermediately along the barrel length; [and]

the nozzle comprises a bushing having an external surface in threaded relation with said threaded surface of the second [bore.] *counterbore, and an inner surface in close-fitting slidable relation with said smaller diameter surface of the barrel; and*

*means for maintaining the bushing and the barrel in fixed axial relationship.*

5. The machine of claim 4 wherein:

*said means for maintaining fixed axial relationship consists of* said outer surface portion of the barrel [is] *being* longer than said bushing and [has] *having* an area exposed outside said bushing[;], and [the nozzle comprises] lock ring means secured to said exposed area to maintain the bushing and the barrel in substantially fixed longitudinal relationship.

References Cited

The following references, cited by the Examiner, are of record in the patented file of this patent or the original patent.

UNITED STATES PATENTS

| | | | |
|---|---|---|---|
| 2,459,048 | 1/1949 | Schwartz | 425—449 X |
| 3,512,216 | 5/1970 | Voelker | 425—247 X |

FOREIGN PATENTS

| | | |
|---|---|---|
| 1,062,169 | 1967 | Great Britain. |

J. SPENCER OVERHOLSER, Primary Examiner

D. B. SMITH, Assistant Examiner

U.S. Cl. X.R.

425—245, 248